(12) United States Patent
Anegawa et al.

(10) Patent No.: US 10,144,455 B2
(45) Date of Patent: Dec. 4, 2018

(54) VEHICLE BODY STRUCTURE

(71) Applicant: HONDA MOTOR CO., LTD., Tokyo (JP)

(72) Inventors: Shota Anegawa, Wako (JP); Toshiaki Okabe, Wako (JP); Jun Horiguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 202 days.

(21) Appl. No.: 14/897,987

(22) PCT Filed: Mar. 25, 2014

(86) PCT No.: PCT/JP2014/058227
§ 371 (c)(1),
(2) Date: Dec. 11, 2015

(87) PCT Pub. No.: WO2014/199695
PCT Pub. Date: Dec. 18, 2014

(65) Prior Publication Data
US 2016/0107701 A1   Apr. 21, 2016

(30) Foreign Application Priority Data

Jun. 14, 2013  (JP) .................................. 2013-125532

(51) Int. Cl.
*B62D 27/02*  (2006.01)
*B62D 25/04*  (2006.01)
*B62D 25/06*  (2006.01)

(52) U.S. Cl.
CPC ............. *B62D 25/04* (2013.01); *B62D 25/06* (2013.01); *B62D 27/023* (2013.01)

(58) Field of Classification Search
CPC ....... B62D 25/04; B62D 25/06; B62D 27/023
See application file for complete search history.

(56) References Cited

U.S. PATENT DOCUMENTS 5,873,618 A *  2/1999  Ejima ................... B62D 25/06
                                                            296/30
7,293,823 B2   11/2007  Chen et al.
(Continued)

FOREIGN PATENT DOCUMENTS

| JP | 2007-083830 | 4/2007 |
|----|-------------|--------|
| JP | 2007-190992 | 8/2007 |

(Continued)

OTHER PUBLICATIONS

International Search Report, dated Jun. 17, 2014 (Jun. 17, 2014).
(Continued)

*Primary Examiner* — Hilary L Gutman
(74) *Attorney, Agent, or Firm* — Rankin, Hill & Clark LLP

(57) ABSTRACT

A vehicle body structure is configured in such a manner that a left center pillar is covered with a left pillar garnish and a left gusset is joined to the upper end of the left center pillar. The left center pillar is provided with a pillar bead protruding toward the outside of a vehicle compartment. The left gusset is provided with a gusset bead that protrudes toward the vehicle compartment along the pillar bead. The gusset bead and the pillar bead form a first closed cross-section. An engagement section that is insertable into a first opening of the first closed cross-section is provided at the upper end of the left pillar garnish.

5 Claims, 9 Drawing Sheets

(56) References Cited

U.S. PATENT DOCUMENTS

| | | | | |
|---|---|---|---|---|
| 2011/0163571 A1* | 7/2011 | Furusako | ............... | B62D 25/06 296/193.06 |
| 2012/0126582 A1* | 5/2012 | Kishi | .................... | B62D 25/06 296/203.01 |
| 2013/0320716 A1* | 12/2013 | Nishimura | ............. | B62D 25/06 296/210 |
| 2014/0028057 A1* | 1/2014 | Nishimura | ............. | B62D 25/06 296/193.06 |
| 2014/0054927 A1* | 2/2014 | Nakamura | ............. | B62D 25/06 296/193.06 |
| 2014/0070571 A1* | 3/2014 | Hong | .................... | B62D 25/06 296/216.07 |
| 2014/0175839 A1* | 6/2014 | Ishigame | ............... | B62D 25/04 296/203.03 |
| 2015/0367794 A1* | 12/2015 | Nishimura | ............. | B62D 25/04 296/187.13 |
| 2016/0107698 A1* | 4/2016 | Oshima | ................ | B62D 21/157 296/187.12 |
| 2016/0129944 A1* | 5/2016 | Nishimura | ............. | B62D 25/06 296/193.06 |
| 2016/0214649 A1* | 7/2016 | Emura | ................... | B62D 25/04 |

FOREIGN PATENT DOCUMENTS

| | | |
|---|---|---|
| JP | 2011-201389 | 10/2011 |
| JP | 2012-106706 | 6/2012 |
| WO | 2011/024552 | 3/2011 |
| WO | 2012/114699 | 8/2012 |

OTHER PUBLICATIONS

Japanese Office Action dated Oct. 31, 2016, partial English translation included, 6 pages.

* cited by examiner

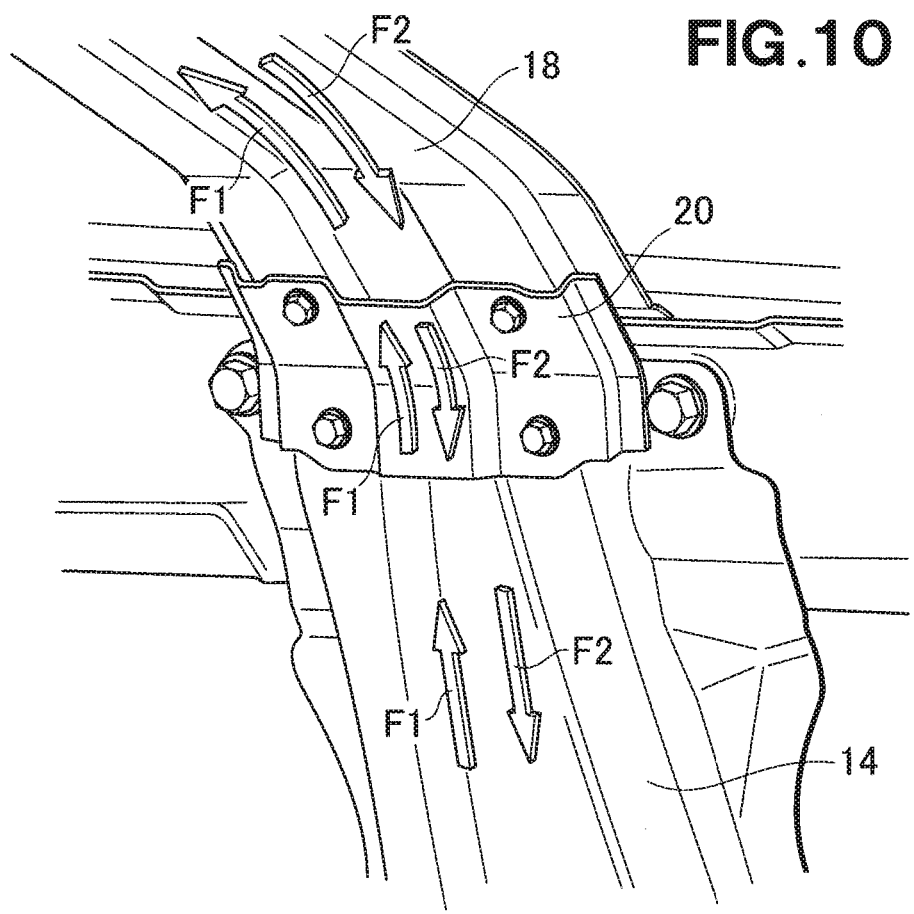

VEHICLE BODY STRUCTURE

TECHNICAL FIELD

The present invention relates to a vehicle body structure in which an engagement portion is provided in a pillar garnish and the engagement portion is engaged with a gusset such that a pillar is covered with the pillar garnish.

BACKGROUND ART

In some known vehicle body structures, roof side rails extending in a front-rear direction of a vehicle body are provided at upper ends of a left pillar and a right pillar, a roof arch spans between the left and right roof side rails, and the roof side rail and a center pillar are coupled through a gusset.

The gusset is provided on an extended line of the center pillar and has a bead swelling toward a vehicle compartment.

By providing the bead in the gusset, a space is formed downward between the bead and the roof side rail. An engagement projection portion (hereinafter, simply referred to as engagement portion) of a pillar garnish is inserted into this space from a lower direction, whereby the engagement portion is engaged with the bead.

Once the engagement portion is engaged with the bead, the pillar garnish is attached to the center pillar from the vehicle compartment side (for example, refer to Patent Literature 1).

However, when the engagement portion of the pillar garnish is inserted into the space in the vehicle body structure according to Patent Literature 1, the engagement portion can interfere with the roof side rail, which prevents assembling workability of the pillar garnish from being enhanced.

In order to prevent the engagement portion from interfering with the roof side rail, it is considered to provide an opening portion in the roof side rail at a section thereof opposing the gusset (bead).

Here, the gusset is provided on the extended line of the center pillar and thus a relatively heavy load is input to the opposing section in the roof side rail. Therefore, rigidity and strength are particularly required in the opposing section in the roof side rail.

For this reason, in a case where the opening portion is provided in the opposing section in the roof side rail, a measure for ensuring the rigidity and strength of the opposing section in the roof side rail is required. It is thus not desirable to provide the opening portion in the opposing section.

PRIOR ART LITERATURE

Patent Literature

Patent Literature JP 2012-106706 A

SUMMARY OF INVENTION

Technical Problem

An object of the present invention is to provide a vehicle body structure capable of enhancing assembling workability of a pillar garnish and further capable of ensuring the rigidity and strength.

Solution to Problem

According to present invention, there is provided a vehicle body structure including a pillar provided at a side portion of a vehicle body and extending in an up-down direction; a pillar garnish covering the pillar on a vehicle compartment side; and a gusset joined to an upper end portion of the pillar from the vehicle compartment side. In the vehicle body structure, the pillar includes a pillar bead extending in the up-down direction and protruding toward the outside of the vehicle compartment. The gusset includes a gusset bead protruding toward the vehicle compartment along the pillar bead at a position overlapping the pillar bead in an inside-outside direction of the vehicle compartment and forming a first closed cross-section portion together with the pillar bead. The pillar garnish includes, at an upper end portion thereof, an engagement portion engaged with the first closed cross-section portion when being inserted into the inside of the first closed cross-section portion.

It is preferable that the pillar include a pillar ridgeline extending along the pillar by being formed with the pillar bead, the gusset include a gusset ridgeline extending along the pillar ridgeline by being formed with the gusset bead, and the pillar ridgeline and the gusset ridgeline be provided so as to be continuous to each other.

It is preferable that the vehicle body structure further include left and right roof side rails extending in a front-rear direction of the vehicle body while being joined to the upper end portions of the pillars and provided on a left side and a right side respectively in a vehicle width direction; and roof member extending in the vehicle width direction so as to be supported by the left and right roof side rails. In the vehicle body structure, the roof member includes a roof bead protruding toward the outside of the vehicle compartment along the gusset bead at a position overlapping the gusset bead in the inside-outside direction of the vehicle compartment and forming a second closed cross-section portion together with the gusset bead.

It is preferable that the roof member include a roof ridgeline extending along the roof member by being formed with the roof bead and the roof ridgeline and the gusset ridgeline be provided so as to be continuous to each other.

Advantageous Effects of Invention

In the invention, the pillar bead of the pillar has been configured to protrude toward the outside of the vehicle compartment, whereas the gusset bead of the gusset has been configured to protrude toward the vehicle compartment. Accordingly, a large space can be secured in the inside of the first closed cross-section portion formed by the gusset bead and the pillar bead.

With this, the engagement portion of the pillar garnish can be smoothly inserted into the inside of the first closed cross-section portion such that the engagement portion is engaged with the first closed cross-section portion. This can enhance assembling workability of the pillar garnish.

Additionally, the first closed cross-section portion is formed and a large space is secured in the inside of the first closed cross-section portion. Therefore, it is not necessary to form an opening portion in a section opposing the gusset bead to ensure assembling workability of the pillar garnish.

As described above, by forming the first closed cross-section portion and thereby eliminating the necessity of the opening portion, the rigidity and strength of the vehicle body structure can be ensured.

Furthermore, the gusset bead and the pillar bead form the first closed cross-section portion to thereby enhance the rigidity and strength of the pillar and the gusset.

In the invention, by providing the pillar ridgeline and the gusset ridgeline so as to be continuous to each other, a load can be efficiently transferred from the pillar to the gusset while a load can be efficiently transferred from the gusset to the pillar.

As a result, the rigidity and strength of the pillar and the gusset can be enhanced. Particularly, the rigidity and strength of a joint portion between the pillar and the gusset can be enhanced.

In the invention, the gusset bead and the roof bead form the second closed cross-section portion to thereby enhance the rigidity and strength of the roof member and the gusset.

In the invention, by providing the roof ridgeline and the gusset ridgeline so as to be continuous to each other, a load can be efficiently transferred from the roof member to the gusset while a load can be efficiently transferred from the gusset to the roof member.

As a result, the rigidity and strength of the roof member and the gusset can be enhanced. Particularly, the rigidity and strength of a joint portion between the roof member and the gusset can be enhanced.

BRIEF DESCRIPTION OF DRAWINGS

FIG. 10 is a view for explaining load transfer among the left center pillar, the left gusset, and a roof arch according to the invention.

DESCRIPTION OF EMBODIMENTS

Best modes for carrying out the invention will be described based on the accompanying drawings. Note that "front (Fr)", "rear (Rr)", "Left (L)", and "right (R)" are defined in accordance with respective directions viewed from a driver.

Embodiment

A vehicle body structure 10 according to an embodiment will be described.

Figure 1:
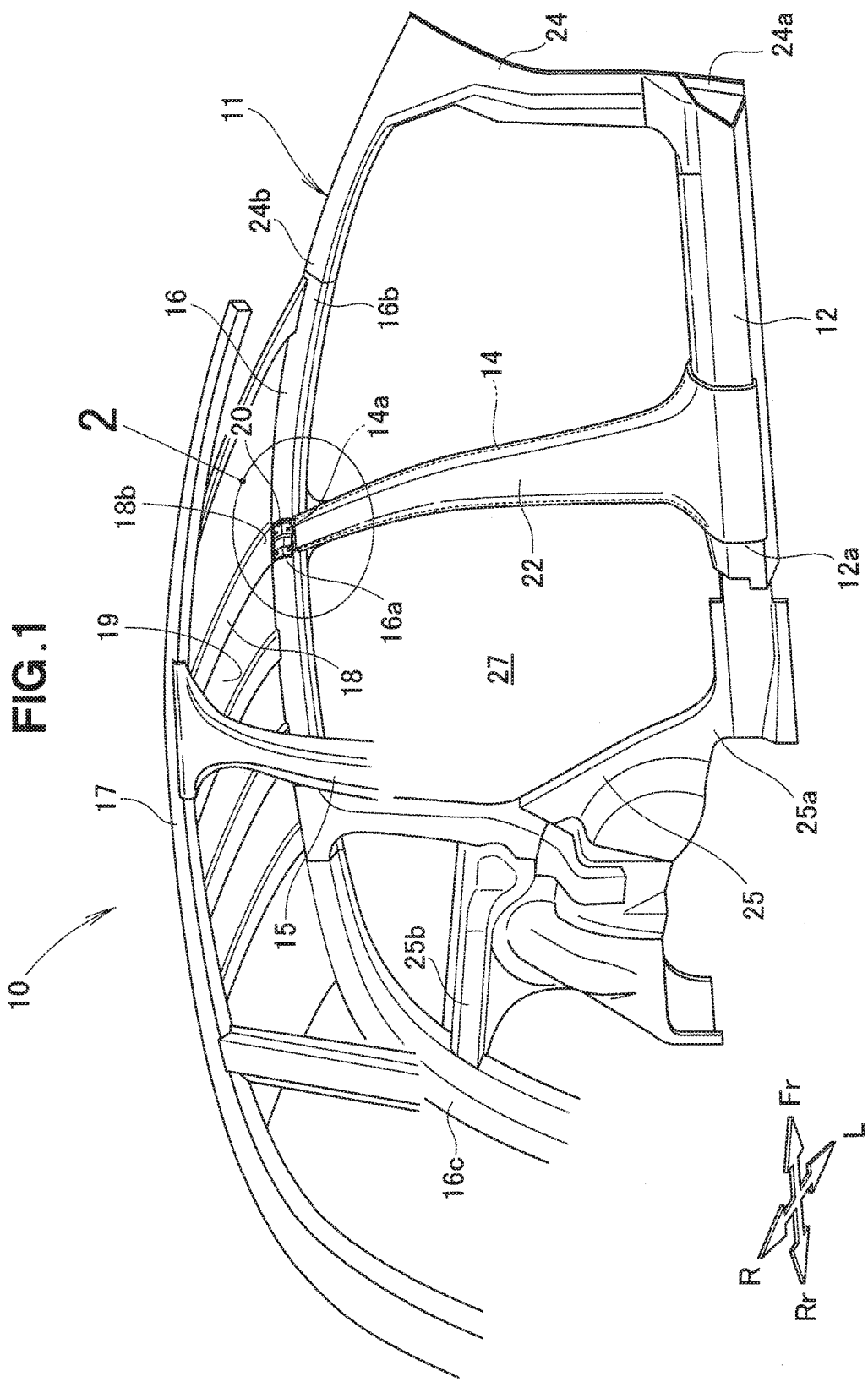
FIG. 1 is a perspective view illustrating a vehicle body structure according to the invention.
Figure 2:
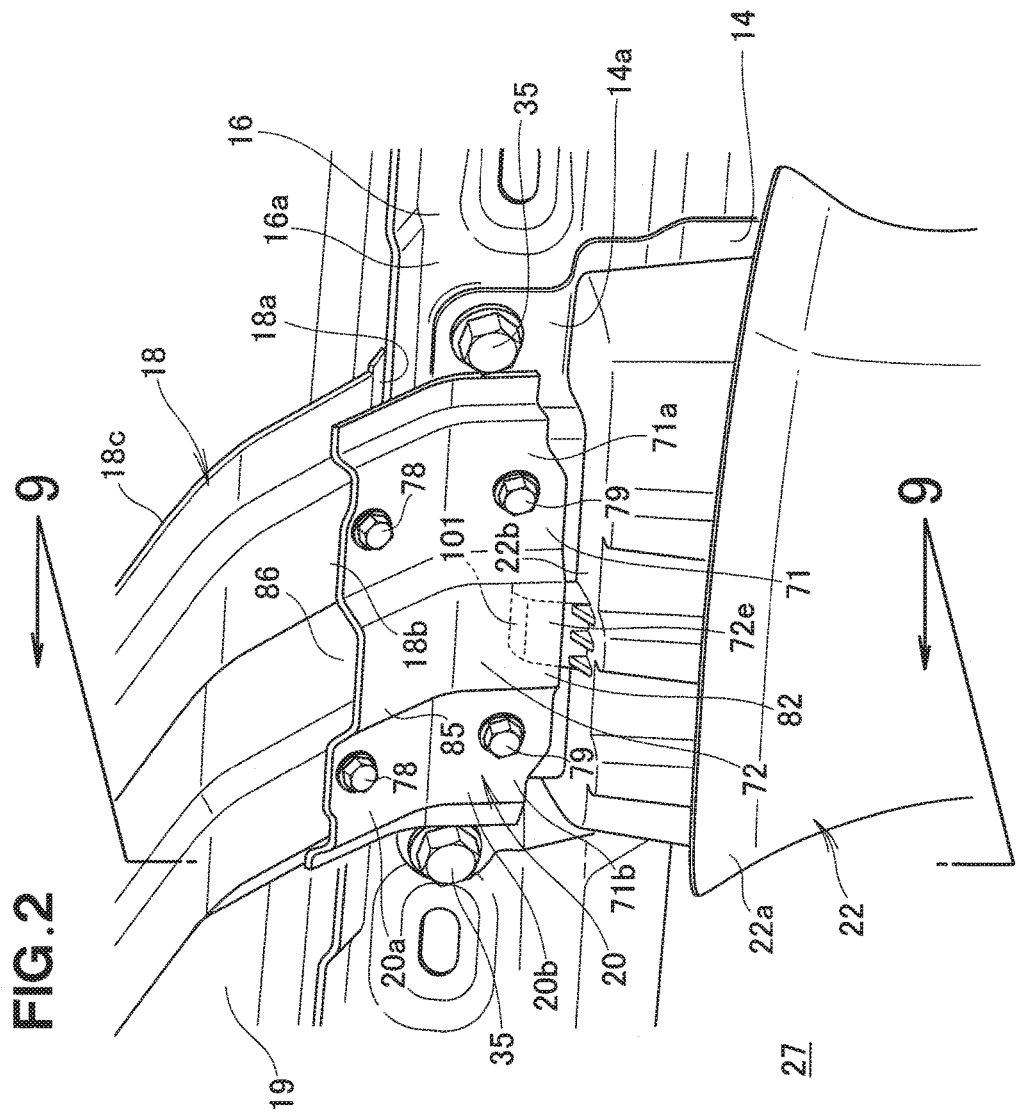
FIG. 2 is an enlarged perspective view of portion 2 in FIG. 1, illustrating a left pillar garnish attached to a left center pillar.

As illustrated in FIGS. 1 and 2, the vehicle body structure 10 includes left and right side sills 12 (only the left side sill 12 is illustrated), left and right center pillars 14 and 15, left and right roof side rails 16 and 17, a roof arch (roof member) 18, a roof 19, left and right gussets 20 (only the left gusset 20 is illustrated), and left and right pillar garnishes 22 (only the left pillar garnish 22 is illustrated).

The left and right side sills 12, the left and right center pillars 14 and 15, the left and right roof side rails 16 and 17, the left and right gussets 20, and the left and right pillar garnishes 22 are provided on a left side and a right side in a vehicle width direction.

Members of each pair of the left and right side sills 12, the left and right center pillars 14 and 15, the left and right roof side rails 16 and 17, the left and right gussets 20, and the left and right pillar garnishes 22 are bilaterally symmetric. Hereinafter, the members on the left side will be described and the description of the members on the right side will be omitted.

The left side sill 12 is an aggregate provided at a left side portion of a floor portion and substantially horizontally extending in a rear direction of a vehicle body from a lower end portion 24a of a left front pillar 24 to a front end portion 25a of a left rear wheel arch 25.

The left center pillar 14 is provided at a substantially central portion 12a of the left side sill 12.

The left center pillar 14 is a supporting column member provided at a left side portion 11 of the vehicle body and extending in an up-down direction. The left center pillar 14 is erected upward from the substantially central portion 12a of the left side sill 12 in a front-rear direction of the vehicle body to a substantially central portion 16a of the left roof side rail 16.

An upper end portion 14a of the left center pillar 14 is joined to the substantially central portion 16a of the left roof side rail 16.

Figure 3:
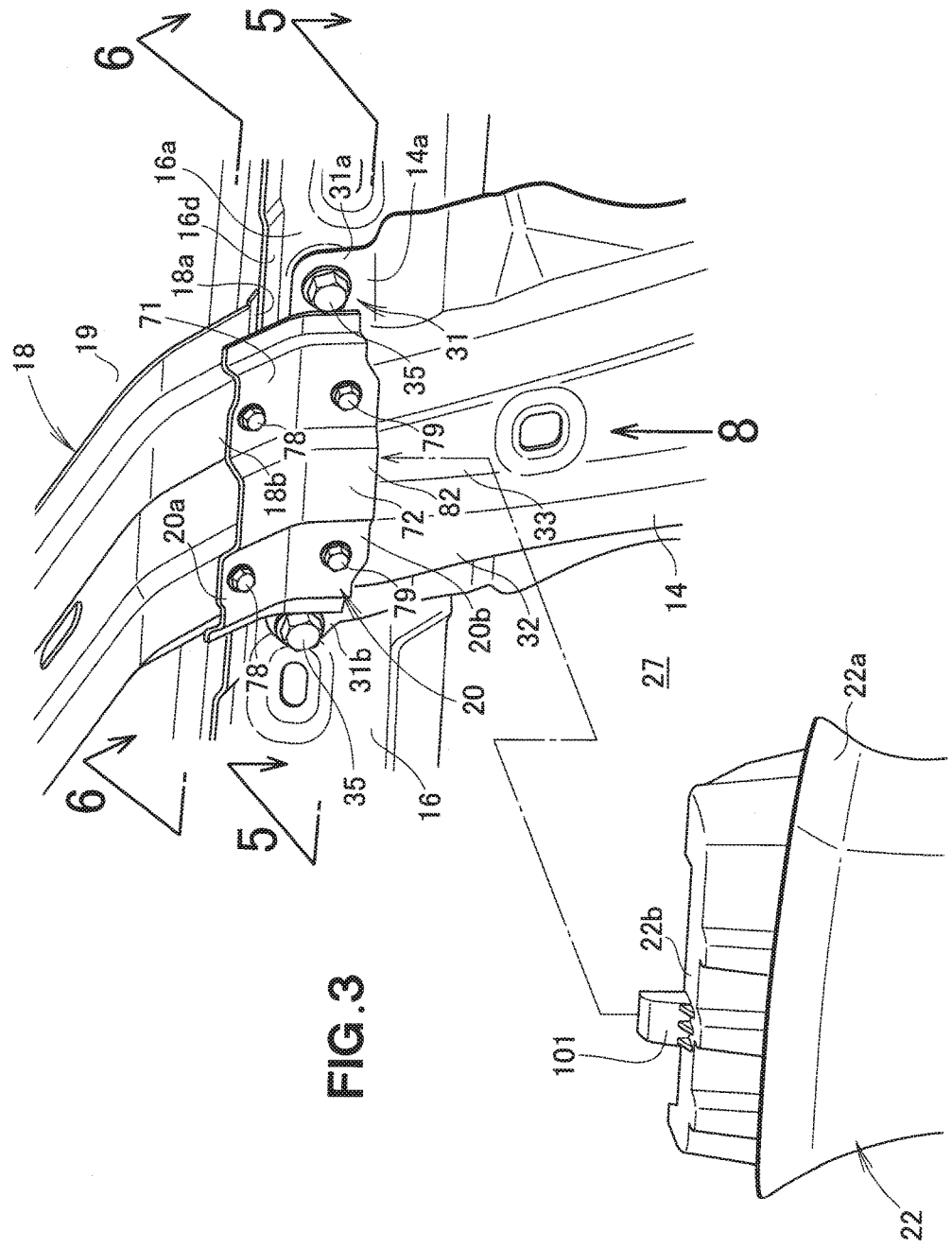
FIG. 3 is an exploded perspective view illustrating the vehicle body structure in FIG. 2 with the left pillar garnish detached therefrom.
Figure 4:
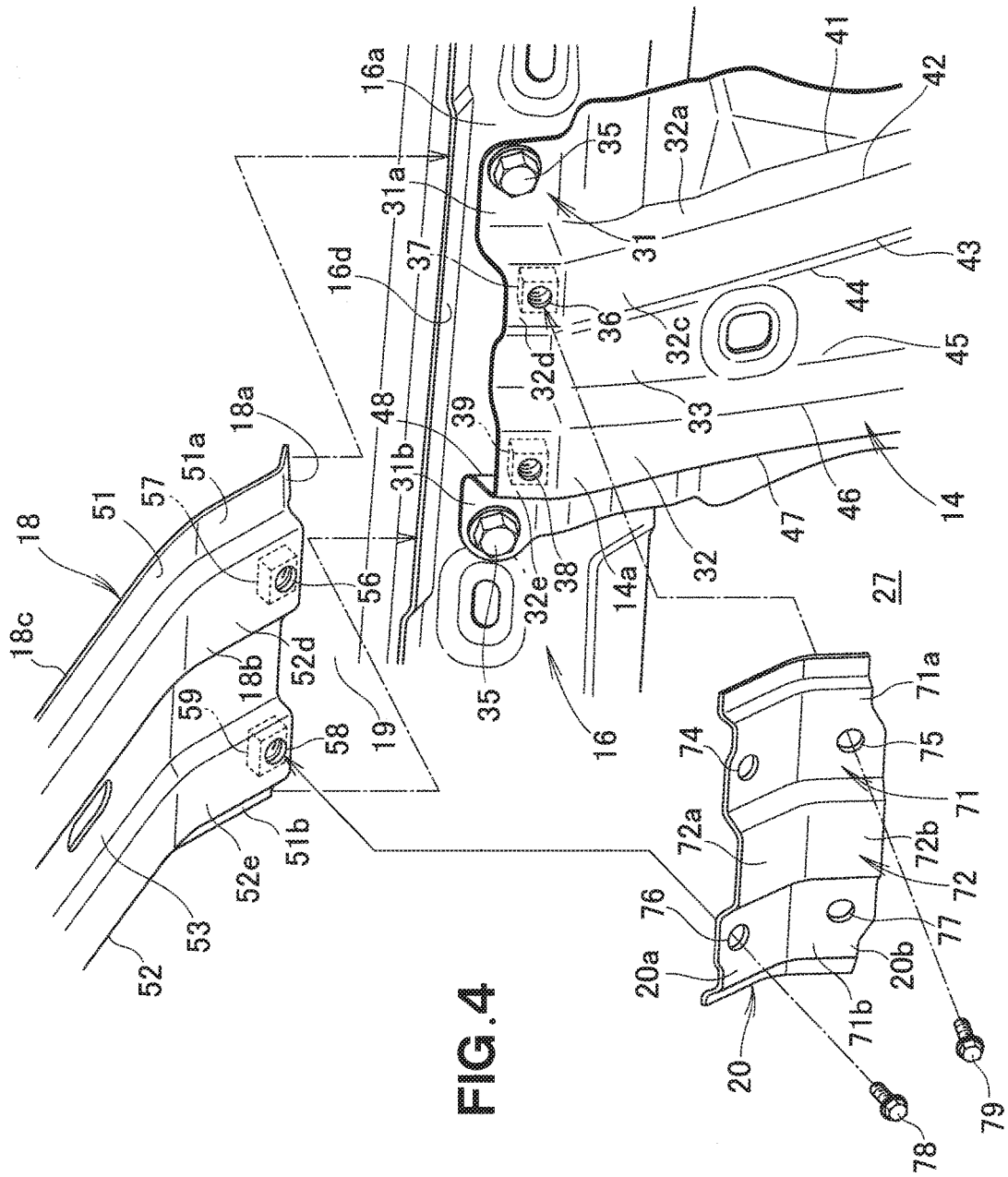
FIG. 4 is an exploded perspective view illustrating the vehicle body structure in FIG. 2.

As illustrated in FIGS. 3 and 4, the left center pillar 14 includes a pillar base 31 joined to the substantially central portion 16a of the left roof side rail 16, a pillar swollen portion 32 provided in the pillar base 31, and a pillar bead 33 provided in the pillar swollen portion 32.

The pillar base 31 includes a front pillar base 31a provided on a front side of the vehicle body and a rear pillar base 31b provided on a rear side of the vehicle body relative to the front pillar base 31a at a predetermined interval. Upper end portions of the front and rear pillar bases 31a and 31b are joined to the substantially central portion 16a of the left roof side rail 16 through a pair of bolts 35.

The pillar swollen portion 32 extends in the up-down direction along a longitudinal direction of the left center pillar 14 and swells toward a vehicle compartment 27 from the pillar base 31.

Figure 5:
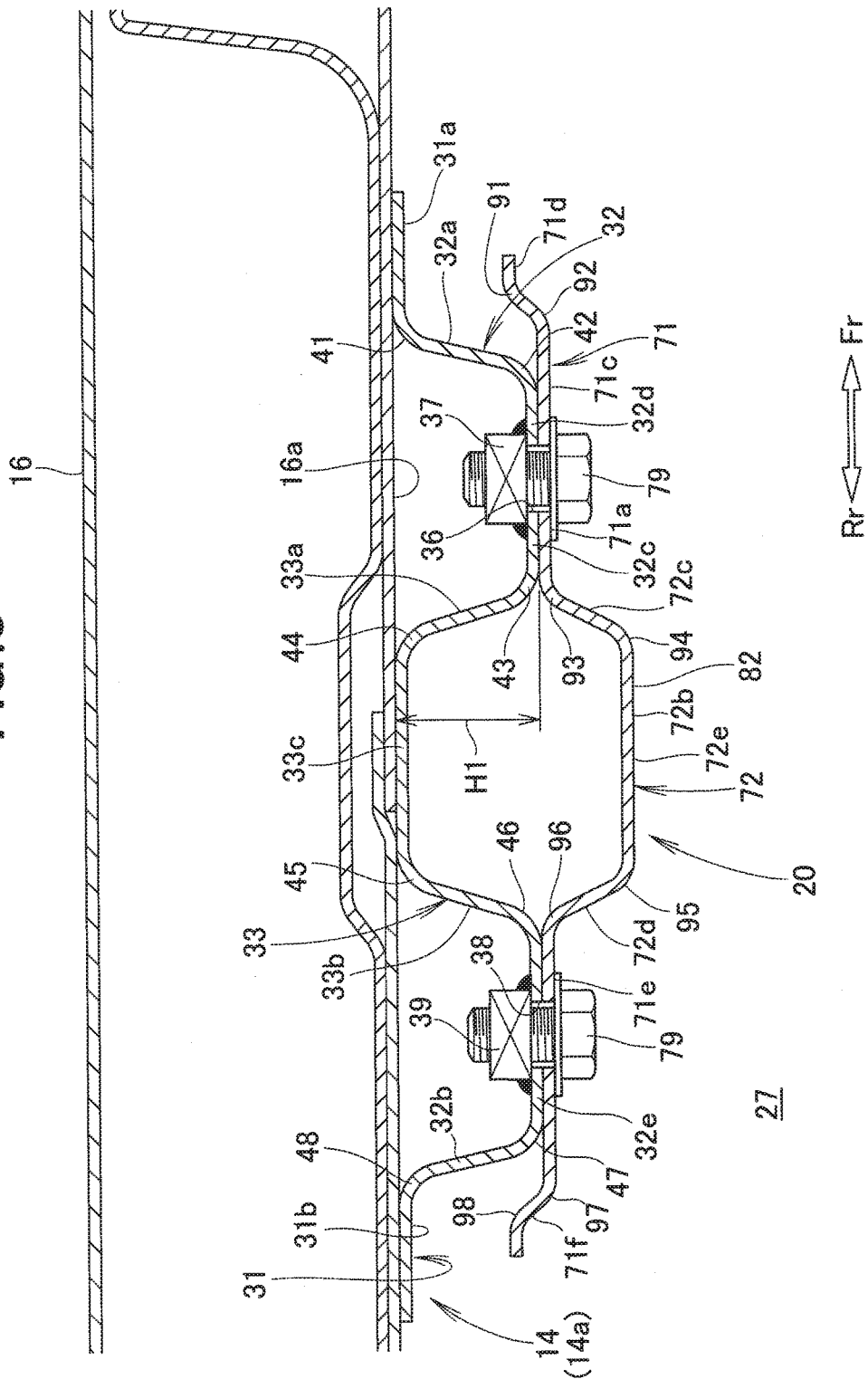
FIG. 5 is a cross-sectional view taken along line 5-5 of FIG. 3.

As illustrated in FIG. 5, the pillar swollen portion 32 includes a front pillar swollen wall 32a, a rear pillar swollen wall 32b, and a pillar swollen top portion 32c. The front pillar swollen wall 32a is bent toward the vehicle compartment 27 from a rear side of the front pillar base 31a. The rear pillar swollen wall 32b is bent toward the vehicle compartment 27 from a front side of the rear pillar base 31b. The pillar swollen top portion 32c is provided on an inner side of the front pillar swollen wall 32a and on an inner side of the rear pillar swollen wall 32b.

The pillar swollen top portion 32c is disposed at a position away from the left roof side rail 16 by a swelling height H1 toward the vehicle compartment 27.

The pillar bead 33 is provided at the center of the pillar swollen top portion 32c in the front-rear direction of the vehicle body. By providing the pillar bead 33 in the pillar swollen top portion 32c, a front pillar swollen top portion 32d and a rear pillar swollen top portion 32e are formed in the pillar swollen top portion 32c.

The front pillar swollen top portion 32d is provided on the side of the front pillar base 31a. The rear pillar swollen top portion 32e is provided on the side of the rear pillar base 31b.

In the front pillar swollen top portion 32d, a front attachment hole 36 is formed at an upper end portion and a front nut 37 is welded to a rear surface. The front nut 37 is coaxially positioned with the front attachment hole 36.

In the rear pillar swollen top portion 32e, as in the case of the front pillar swollen top portion 32d, a rear attachment hole 38 is formed at an upper end portion and a rear nut 39 is welded to a rear surface. The rear nut 39 is coaxially positioned with the rear attachment hole 38.

Referring back to FIG. 4, the pillar bead 33 extends in the up-down direction along the longitudinal direction of the left center pillar 14 (specifically the pillar swollen portion 32) and protrudes (swells) toward the outside of the vehicle compartment 27.

Particularly an upper end portion of the pillar bead 33 protrudes toward the outside of the vehicle compartment 27 along a gusset bead 72 at a position overlapping the gusset bead 72 in an inside-outside direction of the vehicle compartment 27.

As illustrated in FIG. 5, the pillar bead 33 includes a front pillar bead wall 33a, a rear pillar bead wall 33b, and a pillar bead top portion 33c. The front pillar bead wall 33a is bent toward the outside of the vehicle compartment 27 from a rear side of the front pillar swollen top portion 32d. The rear pillar bead wall 33b is bent toward the outside of the vehicle compartment 27 from a front side of the rear pillar swollen top portion 32e. The pillar bead top portion 33c is provided on an outer side of the front pillar bead wall 33a and on an outer side of the rear pillar bead wall 33b.

The pillar bead top portion 33c makes contact with the substantially central portion 16a of the left roof side rail 16.

By forming the pillar base 31, the pillar swollen portion 32, and the pillar bead 33 in the left center pillar 14, first to eighth pillar ridgelines 41 to 48 (also refer to FIG. 4) are provided in the left center pillar 14.

The first to eighth pillar ridgelines 41 to 48 extend in the up-down direction along the left center pillar 14.

The first pillar ridgeline 41 is a section where a bent portion between the front pillar base 31a and the front pillar swollen wall 32a protrudes toward the outside of the vehicle compartment 27. The second pillar ridgeline 42 is a section where a bent portion between the front pillar swollen wall 32a and the front pillar swollen top portion 32d protrudes toward the vehicle compartment 27.

The third pillar ridgeline 43 is a section where a bent portion between the front pillar swollen top portion 32d and the front pillar bead wall 33a protrudes toward the vehicle compartment 27. The fourth pillar ridgeline 44 is a section where a bent portion between the front pillar bead wall 33a and the pillar bead top portion 33c protrudes toward the outside of the vehicle compartment 27.

The fifth pillar ridgeline 45 is a section where a bent portion between the pillar bead top portion 33c and the rear pillar bead wall 33b protrudes toward the outside of the vehicle compartment 27. The sixth pillar ridgeline 46 is a section where a bent portion between the rear pillar bead wall 33b and the rear pillar swollen top portion 32e protrudes toward the vehicle compartment 27.

The seventh pillar ridgeline 47 is a section where a bent portion between the rear pillar swollen top portion 32e and the rear pillar swollen wall 32b protrudes toward the vehicle compartment 27. The eighth pillar ridgeline 48 is a section where a bent portion between the rear pillar swollen wall 32b and the rear pillar base 31b protrudes toward the outside of the vehicle compartment 27.

As illustrated in FIG. 4, the first to eighth pillar ridgelines 41 to 48 extend in the up-down direction along the longitudinal direction of the left center pillar 14.

Referring back to FIGS. 1 and 2, the left roof side rail 16 extends in the front-rear direction of the vehicle body while being joined to the upper end portion 14a of the left center pillar 14. A front end portion 16b of the left roof side rail 16 is joined to a rear end portion 24b of the front pillar 24, whereas a rear end portion 16c thereof is joined to a rear end portion 25b of the rear wheel arch 25.

The roof arch 18 spans between the left roof side rail 16 and the right roof side rail 17.

The roof arch 18 extends in the vehicle width direction in a beam shape such that a left joint portion 18a thereof is supported by the left roof side rail 16 and a right end portion thereof (not illustrated) is supported by the right roof side rail 17.

The left joint portion 18a is a protruding piece projecting toward the outside in the vehicle width direction from a left end portion 18b of the roof arch 18.

As illustrated in FIG. 3, the left joint portion 18a of the roof arch 18 is joined to a central top edge portion 16d of the left roof side rail 16 from an upper direction. The roof 19 is joined to an upper surface 18c of the roof arch 18 (also refer to FIG. 4) and the roof 19 is thus supported by the roof arch 18.

Figure 6:
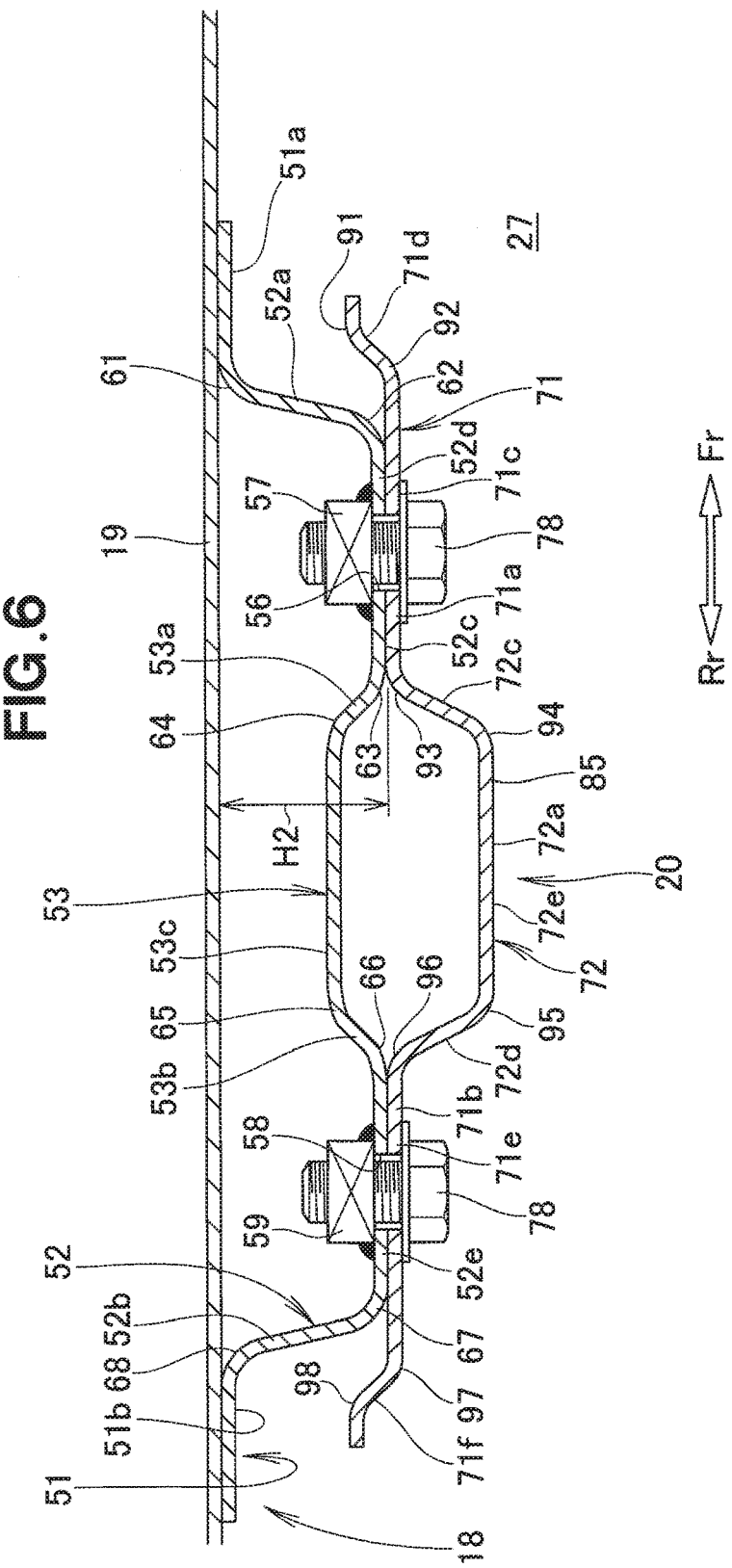
FIG. 6 is a cross-sectional view taken along line 6-6 of FIG. 3.

As illustrated in FIGS. 4 and 6, the roof arch 18 includes a roof base 51 joined to the roof 19 and the central top edge portion 16d of the left roof side rail 16, a roof swollen portion 52 provided in the roof base 51, and a roof bead 53 provided in the roof swollen portion 52.

The roof base 51 includes a front roof base 51a provided on the front side of the vehicle body and a rear roof base 51b provided on the rear side of the vehicle body relative to the front roof base 51a at a predetermined interval.

Left end portions of the front and rear roof bases 51a and 51b (that is, the left joint portion 18a of the left roof side rail 16) are joined to the central top edge portion 16d of the left roof side rail 16 from the upper direction.

The front and rear roof bases 51a and 51b are joined to a rear surface of the roof 19.

The roof swollen portion 52 extends in the vehicle width direction along the longitudinal direction of the roof base 51 and swells toward the vehicle compartment 27 from the roof base 51.

The roof swollen portion 52 includes a front roof swollen wall 52a, a rear roof swollen wall 52b, and a roof swollen, top portion 52c. The front roof swollen wall 52a is bent toward the vehicle compartment 27 from a rear side of the front roof base 51a. The rear roof swollen wall 52b is bent toward the vehicle compartment 27 from a front side of the rear roof base 51b. The roof swollen top portion 52c is provided on an inner side of the front roof swollen wall 52a and on an inner side of the rear roof swollen wall 52b.

The roof swollen top portion 52c is disposed at a position away from the roof 19 by a swelling height H2 toward the vehicle compartment 27.

The roof bead 53 is provided at the center of the roof swollen top portion 52c in the front-rear direction of the vehicle body. By providing the roof bead 53 in the roof swollen top portion 52c, the roof swollen top portion 52c includes a front roof swollen top portion 52d provided on the side of the front roof base 51a and a rear roof swollen top portion 52e provided on the side of the rear roof base 51b.

In the front roof swollen top portion 52d, a front attachment hole 56 is formed at a left end portion and a front nut 57 is welded to a rear surface. The front nut 57 is coaxially positioned with the front attachment hole 56.

In the rear roof swollen top portion 52e, as in the case of the front roof swollen top portion 52d, a rear attachment hole 58 is formed at a left end portion and a rear nut 59 is welded to a rear surface. The rear nut 59 is coaxially positioned with the rear attachment hole 58.

The roof bead 53 extends in the vehicle width direction along the longitudinal direction of the roof arch 18 (specifically, the roof swollen portion 52) and protrudes (swells) toward the outside of the vehicle compartment 27.

Particularly, a left end portion of the roof bead 53 protrudes toward the outside of the vehicle compartment 27 along the gusset bead 72 at a position overlapping the gusset bead 72 in the inside-outside direction of the vehicle compartment 27.

The roof bead 53 includes a front roof bead wall 53a, a rear roof bead wall 53b, and a roof bead top portion 53c. The front roof bead wall 53a is bent toward the outside of the vehicle compartment 27 from a rear side of the front roof swollen top portion 52d. The rear roof bead wall 53b is bent toward the outside of the vehicle compartment 27 from a front side of the rear roof swollen top portion 52e. The roof bead top portion 53c is provided, on an outer side of the front roof bead wall 53a and on an outer side of the rear roof bead wall 53b.

By forming the roof base 51, the roof swollen portion 52, and the roof bead 53 in the roof arch 18, first to eighth, roof ridgelines 61 to 68 are provided in the roof arch 18.

The first to eighth roof ridgelines 61 to 68 extend in the vehicle width direction along the roof arch 18.

The first roof ridgeline 61 is a section where a bent portion between the front roof base 51a and the front roof swollen wall 52a protrudes toward the outside of the vehicle compartment 27. The second roof ridgeline 62 is a section where a bent portion between the front roof swollen wall 52a and the front roof swollen top portion 52d protrudes toward the vehicle compartment 27.

The third roof ridgeline 63 is a section where a bent portion between the front roof swollen top portion 52d and the front roof bead wall 53a protrudes toward the vehicle compartment 27. The fourth roof ridgeline 64 is a section where a bent portion between the front roof bead wall 53a and the roof bead top portion 53c protrudes toward the outside of the vehicle compartment 27.

The fifth roof ridgeline 65 is a section where a bent portion between the roof bead top portion 53c and the rear roof bead wall 53b protrudes toward the outside of the vehicle compartment 27. The sixth roof ridgeline 66 is a section where a bent portion between the rear roof bead wall 53b and the rear roof swollen top portion 52e protrudes toward the vehicle compartment 27.

The seventh roof ridgeline 67 is a section where a bent portion between the rear roof swollen top portion 52e and the rear roof swollen wall 52b protrudes toward the vehicle compartment 27. The eighth roof ridgeline 68 is a section where a bent portion between the rear roof swollen wall 52b and the rear roof base 51b protrudes toward the outside of the vehicle compartment 27.

The first to eighth roof ridgelines 61 to 68 extend in the vehicle width direction along the longitudinal direction of the roof arch 18.

Referring back to FIGS. 2 and 4, the left gusset 20 is joined, from the side of the vehicle compartment 27, to the left end portion 18b of the roof arch 18 and the upper end portion 14a of the left center pillar 14.

An upper end portion 20a of the left gusset 20 is formed along the left end portion 18b of the roof arch 18, whereas a lower end portion 20b thereof is formed along the upper end portion 14a of the left center pillar 14.

The left gusset 20 includes a gusset base 71 joined to the left end portion 18b of the roof arch 18 and the upper end portion 14a of the left center pillar 14, and the gusset bead 72 provided in the gusset base 71.

The gusset base 71 includes a front gusset base 71a formed along a left end portion of the front roof base 51a and an upper end portion of the front pillar base 31a, and a rear gusset base 71b formed along a left end portion of the rear roof base 51b and an upper end portion of the rear pillar base 31b.

As illustrated in FIGS. 5 and 6, the front gusset base 71a includes a front gusset joint portion 71c joined to a left end portion of the front roof swollen top portion 52d and an upper end portion of the front pillar swollen top portion 32d, and a front gusset bent portion 71d provided on a front side of the front gusset joint portion 71c.

Figure 7:
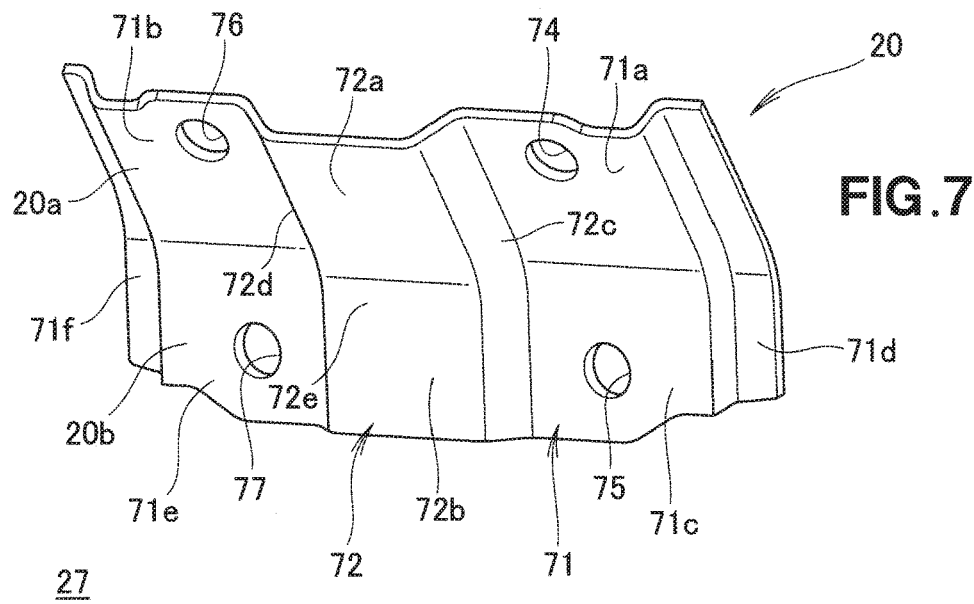
FIG. 7 is a perspective view illustrating a left gusset in FIG. 4.

In the front gusset joint portion 71c as illustrated in FIGS. 4 and 7, a front upper attachment hole 74 is provided at an upper end portion and a front lower attachment hole 75 is provided at a lower end portion.

While the left gusset 20 is overlapped with the left end portion 18b of the roof arch 18 and the upper end portion 14a of the left center pillar 14, the front gusset joint portion 71c makes contact with the front of swollen top portion 52d and the front pillar swollen top portion 32d.

When the front gusset joint portion 71c is in contact with the front roof swollen top portion 52d and the front pillar swollen top portion 32d, the front upper attachment hole 74 is coaxially positioned with the front attachment hole 56 of the roof arch 18, whereas the front lower attachment hole 75, is coaxially positioned with the front attachment hole 36 of the left center pillar 14.

By providing the front gusset bent portion 71d on the front side of the front gusset joint portion 71c, the front gusset joint portion 71e is reinforced by the front gusset bent portion 71d.

The rear gusset base 71b includes a rear gusset joint portion 71e joined to a left end portion of the rear roof swollen top portion 52e and an upper end portion of the rear pillar swollen top portion 32e, and a rear gusset bent portion 71f provided on a rear side of the rear gusset joint portion 71e.

In the rear gusset joint portion 71e, a rear upper attachment hole 76 is provided at an upper end portion and a rear lower attachment hole 77 is provided at a lower end portion.

While the left gusset 20 is overlapped with the left end portion 18b of the roof arch 18 and the upper end portion 14a of the left center pillar 14, the rear gusset joint port n 71e makes contact with the rear roof swollen top portion 52e and the rear pillar swollen top portion 32e.

When the rear gusset joint portion 71e is in contact with the rear roof swollen top portion 52e and the rear pillar swollen top portion 32e, the rear upper attachment hole 76 is coaxially positioned with the rear attachment hole 58 of the roof arch 18, whereas the rear lower attachment hole 77 is coaxially positioned with the rear attachment hole 38 of the left center pillar 14.

By providing the rear gusset bent portion 71f on the rear side of the rear gusset joint portion 71e, the rear gusset joint portion 71e is reinforced by the rear gusset bent portion 71f.

The gusset bead 72 protrudes (swells) toward the vehicle compartment 27 from the gusset base 71.

The gusset bead 72 is formed such that an upper end portion (hereinafter, referred to as gusset bead upper end portion) 72a opposes the left end portion of the roof bead 53, and a lower end portion (hereinafter, referred to as gusset bead lower end portion) 72b opposes the upper end portion of the pillar bead 33.

The gusset bead 72 includes a front gusset bead wall 72c, a rear gusset bead wall 72d, and a gusset bead top portion 72e. The front gusset bead wall 72c is bent toward the vehicle compartment 27 from a rear side of the front gusset joint portion 71c. The rear gusset bead wall 72d is bent toward the vehicle compartment 27 from a front side of the rear gusset joint portion 71e. The gusset bead top portion 72e is provided on an inner side of the front gusset bead wall 72c and on an inner side of the rear gusset bead wall 72d.

The gusset bead upper end portion 72a protrudes toward the vehicle compartment 27 along the left end portion of the roof bead 53 at a position overlapping the left end portion of the roof bead 53 in the inside-outside direction of the vehicle compartment 27.

The gusset bead lower end portion 72b protrudes toward the vehicle compartment 27 along the upper end portion of the pillar bead 33 at a position overlapping the upper end portion of the pillar bead 33 in the inside-outside direction of the vehicle compartment 27.

A bolt 78 is inserted into the front upper attachment hole 74 of the left gusset 20 and the front attachment hole 56 of the roof arch 18 such that the inserted bolt 78 is screwed into and coupled to the front nut 57 of the roof arch 18.

Likewise, the bolt 78 is inserted into the rear upper attachment hole 76 of the left gusset 20 and the rear attachment hole 58 of the roof arch 18 such that the inserted bolt 78 is screwed into and coupled to the rear nut 59 of the roof arch 18.

Additionally, a bolt 79 is inserted into the front lower attachment hole 75 of the left gusset 20 and the front attachment hole 36 of the left center pillar 14 such that the inserted bolt 79 is screwed into and coupled to the front nut 37 of the left center pillar 14.

Likewise, the bolt 79 is inserted into the rear lower attachment hole 77 of the left gusset 20 and the rear attachment hole 38 of the left center pillar 14 such that the inserted bolt 79 is screwed into and coupled to the rear nut 39 of the left center pillar 14.

As a result, the left end portion 18b of the roof arch 18 and the upper end portion 14a of the left center pillar 14 are joined to the left gusset 20 through the bolts 78 and 79 and the nuts 57, 59, 37, and 39 while being overlapped therewith (also refer to FIG. 3).

In this state, a second closed cross-section portion 85 (refer to FIG. 6) is formed by the gusset bead upper end portion 72a and the left end portion of the roof bead 53. Likewise, a first closed cross-section portion 82 (refer to FIG. 5) is formed by the gusset bead lower end portion 72b and the upper end portion of the pillar bead 33.

The first closed cross-section portion 82 is formed by the pillar bead 33 and the gusset bead 72 to thereby enhance the rigidity and strength of the left center pillar 14 and the left gusset 20.

The second closed cross-section portion 85 is formed by h roof bead 53 and the gusset bead 72 to thereby enhance the rigidity and strength of the roof arch 18 and the left gusset 20.

Figure 8:
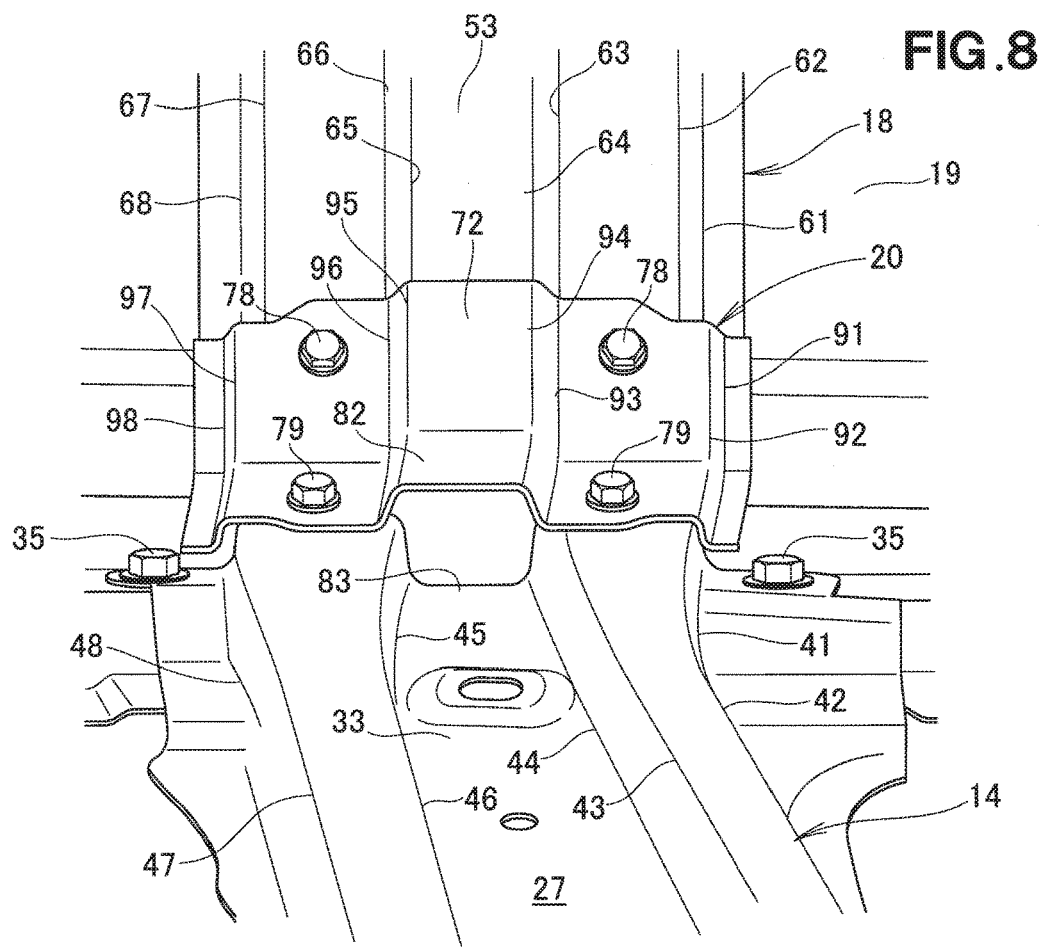
FIG. 8 is a view on arrow 8 in FIG. 3.

As illustrated in FIG. 8, the first closed cross-section portion 82 includes a first opening portion (internal) 83 opening in a lower direction of the vehicle compartment 27.

By forming the first closed cross-section portion 82 with the gusset bead lower end portion 72b and the pillar bead 33 (upper end portion), the first opening portion 83 is formed larger in size.

Meanwhile, as illustrated in FIG. 2, the second closed cross-section portion 85 includes a second opening portion 86 opening in an upper direction of the vehicle compartment 27.

Referring back to FIGS. 5 and 6, by forming the gusset base 71 and the gusset bead 72 in the left gusset 20, first to eighth gusset ridgelines 91 to 98 are provided in the left gusset 20.

The first to eighth gusset ridgelines 91 to 98 extend along the left gusset 20.

The first gusset ridgeline 91 is a section where the front gusset bent portion 71d protrudes toward the outside of the vehicle compartment 27. The second gusset ridgeline 92 is a section where a bent portion between the front gusset bent portion 71d and the front gusset joint portion 71c protrudes toward the vehicle compartment 27.

The third gusset ridgeline 93 is a section where a bent portion between the front gusset joint portion 71c and the front gusset bead wall 72c protrudes toward the outside of the vehicle compartment 27. The fourth gusset ridgeline 94 is a section where a bent portion between the front gusset bead wall 72c and the gusset bead top portion 72e protrudes toward the vehicle compartment 27.

The fifth gusset ridgeline 95 is a section where a bent portion between the gusset bead top portion 72e and the rear gusset bead wall 72d protrudes toward the vehicle compartment 27. The sixth gusset ridgeline 96 is a section where a bent portion between the rear gusset bead wall 72d and the rear gusset joint portion 71e protrudes toward the outside of the vehicle compartment 27.

The seventh gusset ridgeline 97 is a section where a bent portion between the rear gusset joint portion 71e and the rear gusset bent portion 71f protrudes toward the vehicle compartment 27. The eighth gusset ridgeline 98 is a section where the rear gusset bent portion 71f protrudes toward the outside of the vehicle compartment 27.

The first to eighth gusset ridgelines 91 to 98 extend in the vehicle width direction along the longitudinal direction of the left gusset 20 (specifically, extend along the longitudinal directions of the left center pillar 14 and the roof arch 18).

Referring back to FIG. 8, the first gusset ridgeline 91 extends along the first pillar ridgeline 41 and the first roof ridgeline 61 so as to be continuous to the first pillar ridgeline 41 and the first roof ridgeline 61 when viewed in the vehicle width direction.

The second gusset ridgeline 92 extends along the second pillar ridgeline 42 and the second roof ridgeline 62 so as to be continuous to the second pillar ridgeline 42 and the second roof ridgeline 62 when viewed in the vehicle width direction.

The third gusset ridgeline 93 extends along the third pillar ridgeline 43 and the third roof ridgeline 63 so as to be continuous to the third pillar ridgeline 43 and the third roof ridgeline 63 when viewed in the vehicle width direction.

The fourth gusset ridgeline 94 extends along the fourth pillar ridgeline 44 and the fourth roof ridgeline 64 so as to be continuous to the fourth pillar ridgeline 44 and the fourth roof ridgeline 64 when viewed in the vehicle width direction.

The fifth gusset ridgeline 95 extends along the fifth pillar ridgeline 45 and the fifth roof ridgeline 65 so as to be continuous to the fifth pillar ridgeline 45 and the fifth roof ridgeline 65 when viewed in the vehicle width direction.

The sixth gusset ridgeline 96 extends along the sixth pillar ridgeline 46 and the sixth roof ridgeline 66 so as to be continuous to the sixth pillar ridgeline 46 and the sixth roof ridgeline 66 when viewed in the vehicle width direction.

The seventh gusset ridgeline 97 extends along the seventh pillar ridgeline 47 and the seventh roof ridgeline 67 so as to be continuous to the seventh pillar ridgeline 47 and the seventh roof ridgeline 67 when viewed in the vehicle width direction.

The eighth gusset ridgeline 98 extends along the eighth pillar ridgeline 48 and the eighth roof ridgeline 68 so as to be continuous to the eighth pillar ridgeline 48 and the eighth roof ridgeline 68 when viewed in the vehicle width direction.

As illustrated in FIGS. 2 and 3, the left pillar garnish 22 is engaged with the left gusset 20 and the left center pillar 14 is then covered with the left pillar garnish 22 from the side of the vehicle compartment 27.

In the left pillar garnish 22, an engagement portion 101 protrudes upward from a center 22b in the front-rear direction of the vehicle body in an upper end portion 22a.

The engagement portion 101 is formed to be inserted into the first opening portion 83 (refer to FIG. 8) from a lower direction of the first closed cross-section portion 82 and be engaged (make contact) with the gusset bead top portion 72e (also refer to FIG. 5) of the first closed cross-section portion 82.

Figure 9:
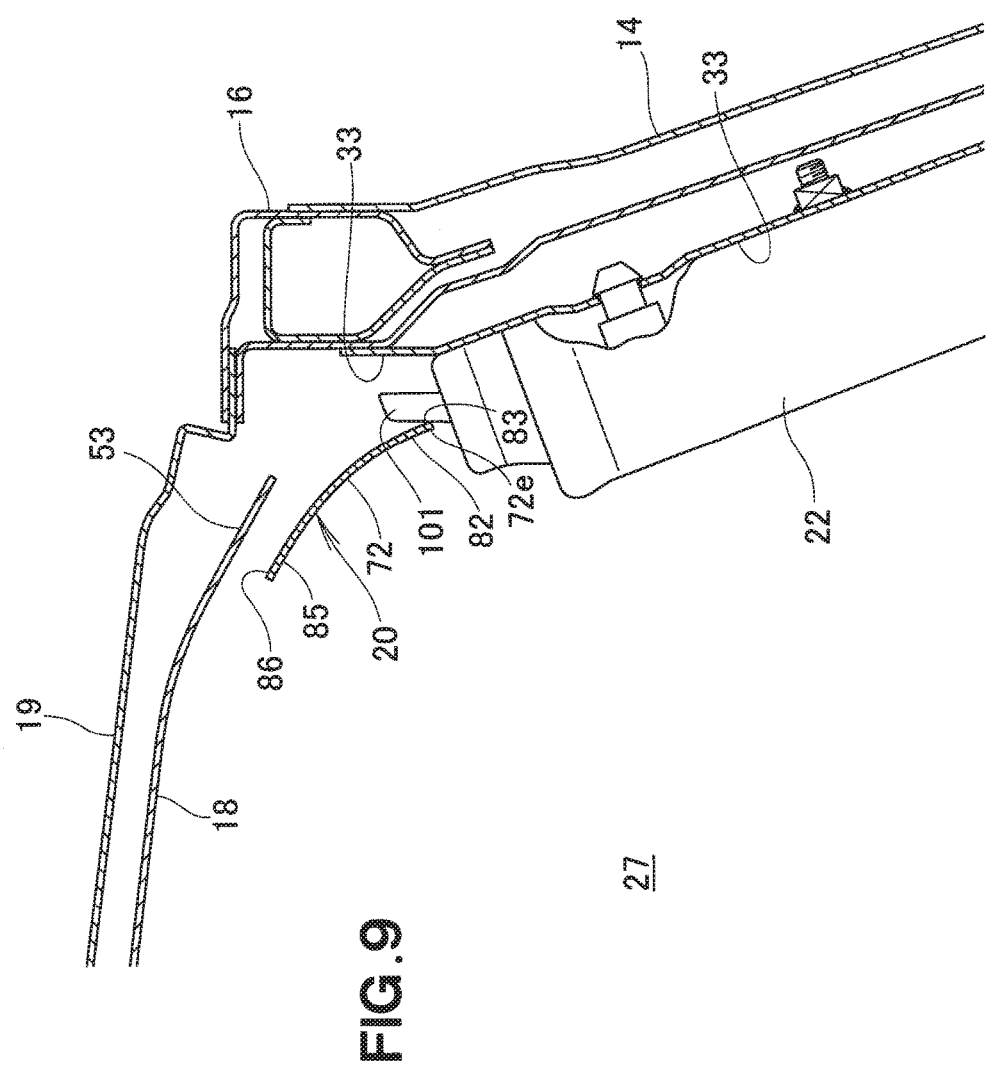
FIG. 9 is a cross-sectional view taken along line 9-9 of FIG. 2.

As illustrated in FIG. 9, the engagement portion 101 is inserted into the first opening portion 83 to be engaged with the gusset bead top portion 72e of the first closed cross-section portion 82.

As a result, the left pillar garnish 22 is attached to the left center pillar 14 and the left center pillar 14 is covered with the left pillar garnish 22 from the side of the vehicle compartment 27.

As illustrated, in FIGS. 8 and 9, the pillar bead 33 of the left center pillar 14 protrudes toward the outside of the vehicle compartment 27, whereas the gusset bead 72 of the left gusset 20 protrudes toward the vehicle compartment 27.

Accordingly, a large space can be secured in the first opening portion 83 of the first closed cross-section portion 82 formed by the gusset bead 72 and the pillar bead 33.

When a large space is secured in the first opening portion 83, the engagement portion 101 of the left pillar garnish 22 can be smoothly inserted into the first opening portion 83.

As a result, the engagement portion 101 of the left pillar garnish 22 can be engaged with the first closed cross-section portion 82 without much effort. This enhances assembling workability of the left pillar garnish 22.

In this manner, the first closed cross-section portion 82 is formed to secure a large space in the first opening portion 83 of the first closed cross-section portion 82. Therefore, it is not necessary to form an opening portion in a section opposing the gusset bead 72 to ensure smooth insertion of the left pillar garnish 22 (specifically, engagement portion 101).

As described thus far, by forming the first closed cross-section portion 82 and thereby eliminating the necessity of the opening portion, the rigidity and strength of the vehicle body structure, in particular, an upper part of the vehicle body structure can be ensured.

Next, load transfer among the left center pillar 14, the left gusset 20, and the roof arch 18 will be described based on FIGS. 8 and 10.

As illustrated in FIG. 8, the first to eighth gusset ridgelines 91 to 98, the first to eighth first pillar ridgelines 41 to 48, and the first to eighth roof ridgelines 61 to 68 are provided so as to be continuous, respectively, when viewed in the vehicle width direction.

As illustrated in FIG. 10, a load F1 can be efficiently transferred from the left center pillar 14 to the left gusset 20. In addition, the load F1 transferred to the left gusset 20 can be efficiently transferred from the left gusset 20 to the roof arch 18.

On the other hand, a load F2 can be efficiently transferred from the roof arch 18 to the left gusset 20. In addition, the load F2 transferred to the left gusset 20 can be efficiently transferred from the left gusset 20 to the left center pillar 14.

As a result, the rigidity and strength of the left center pillar 14, the left gusset 20, and the roof arch 18 can be enhanced. In particular, the rigidity and strength of a joint portion between the left center pillar 14 and the left gusset 20 and a joint portion between the roof arch 18 and the left gusset 20 can be enhanced.

Note that the vehicle body structure according to the invention should not be construed to be limited to the aforementioned embodiment, and various modifications and improvements can be made as appropriate.

For example, the roof arch 18 has been exemplified as the roof member in the aforementioned embodiment; however, the roof member is not limited thereto. As an example, another member such as a roof stiffener used to support a sunroof in a vehicle with a sunroof can be employed as the roof member.

Additionally, an example where the invention is applied to the left and right center pillars 14 and 15 as the pillars has been described in the aforementioned embodiment; however the pillar is not limited, thereto. For example, the invention can be applied to other pillars such as a front pillar and a quarter pillar to achieve similar effects to those in the embodiment.

Furthermore, the shapes and formation of the vehicle body structure, the left side portion of the vehicle body, the left and right, center pillars, the left and right roof side rails, the roof arch, the left gusset, the left pillar garnish, the pillar bead, the first to eighth pillar ridgelines, the roof bead, the first to eighth roof ridgelines, the gusset bead, the first closed cross-section portion, the first opening portion, the second closed cross-section portion, the first to eighth gusset ridgelines, the engagement portion, and the like, which have been exemplified in the aforementioned embodiment, are not limited to the examples indicated herein, and modifications can be made as appropriate.

INDUSTRIAL APPLICABILITY

The present invention is favorably applied to a vehicle having a vehicle body structure in which an engagement portion is provided in a pillar garnish and the engagement portion is engaged with a gusset such that a pillar is covered with the pillar garnish.

REFERENCE SIGNS LIST

10 Vehicle body structure
11 Left side portion of vehicle body (vehicle body side portion)
14, 15 Left and right center pillars (pillars)
14a Upper end portion of left center pillar
16, 17 Left and right roof side rails
18 Roof arch (roof member)
18b Left end portion of roof arch
20 Left gusset (gusset)

22 Left pillar garnish (pillar garnish)
22a Upper end portion of left pillar garnish
27 Vehicle compartment
33 Pillar bead
41 to 48 First to eighth pillar ridgelines (pillar ridgelines)
53 Roof bead
61 to 68 First to eighth roof ridgelines (roof ridgelines)
72 Gusset bead
82 First closed cross-section portion
83 First opening portion (internal)
85 Second closed cross-section portion
91 to 98 First to eighth gusset ridgelines (gusset ridgelines)
101 Engagement portion

The invention claimed is:

1. A vehicle body structure comprising:
a pillar provided at a side portion of a vehicle body and extending in an up-down direction;
a pillar garnish covering the pillar on a vehicle compartment side;
a gusset joined to an upper end portion of the pillar from the vehicle compartment side; and
a roof member extending in the vehicle width direction so as to be supported by left and right roof side rails extending in a front-rear direction of the vehicle body while being joined to the upper end portions of the pillars and provided on a left side and a right side respectively in the vehicle width direction, wherein
the pillar includes a pillar bead extending in the up-down direction and protruding toward the outside of the vehicle compartment,
the gusset includes a gusset bead protruding toward the vehicle compartment along the pillar bead at a position overlapping the pillar bead in an inside-outside direction of the vehicle compartment and forming a first closed cross-section section together with the pillar bead,
the pillar garnish includes, at an upper end portion thereof, an engagement section engaged with the first closed cross-section section when being inserted into the inside of the first closed cross-section section,
the roof member includes a roof base joined to a roof, a roof swollen portion provided in the roof base and swelling toward the vehicle compartment from the roof base, and a roof bead provided in the roof swollen portion, the roof bead protruding toward the outside of the vehicle compartment along the gusset bead at a position overlapping the gusset bead in the inside-outside direction of the vehicle compartment and forming a second closed cross-section section together with the gusset bead,
an opening portion of the first closed cross-section section formed by a lower end of the gusset bead and an upper end of the pillar bead is larger than an opening portion of the second closed cross-section section formed by an upper end of the gusset bead and the roof bead, and
the roof, the roof bead and roof swollen portion are configured to form a third closed cross-section section which is separated from the second closed cross-section section by the roof bead.

2. The vehicle body structure according to claim 1, wherein
the pillar includes a pillar ridgeline extending along the pillar by being formed with the pillar bead, and
the gusset includes a gusset ridgeline extending along the pillar ridgeline by being formed with the gusset bead.

3. The vehicle body structure according to claim 1, wherein
the roof member includes a roof ridgeline extending along the roof member by being formed with the roof bead.

4. The vehicle body structure according to claim 2, wherein
the roof member includes a roof ridgeline extending along the roof member by being formed with the roof bead.

5. The vehicle body structure according to claim 1, wherein the pillar bead is jointed to the roof side rail and is separated from the pillar.

* * * * *